HIRO MORIYASU
INVENTOR

BY
BUCKHORN, BLORE, KLARQUIST & SPARKMAN
ATTORNEYS

United States Patent Office 3,439,282
Patented Apr. 15, 1969

3,439,282
TIME BASE GENERATOR WITH AUTOMATIC RATE CONTROL
Hiro Moriyasu, Portland, Oreg., assignor to Tektronix, Inc., Beaverton, Oreg., a corporation of Oregon
Filed Aug. 20, 1965, Ser. No. 481,230
Int. Cl. H03k 4/08, 5/20, 3/58
U.S. Cl. 328—185                               11 Claims

ABSTRACT OF THE DISCLOSURE

A time base generator having a circuit for charging a capacitor at a constant rate to produce a linear time base signal includes a plurality of capacitors and resistors which can be selectively inserted in the circuit to cause such signal to be produced at any one of a plurality of predetermined rates. The proper capacitor and resistor combination to provide a predetermined rate appropriate for the display by a cathode ray tube of an input signal having a repetitive waveform is automatically selected and inserted into the circuit.

---

The invention will be described in connection with cathode ray oscilloscopes and in using such oscilloscopes it is usually desirable to employ a sweep speed such that at least one complete repetition but less than two repetitions of a repetitive signal is displayed on the screen of such oscilloscope, although at times it is useful to display two or even more such repetitions. Selecting the appropriate sweep speed has usually been accomplished by the manual turning of switch knob connected to a rotary switch which may have a large number of switch positions, for example, twenty-four. This is time consuming since it requires the operator to manually readjust the sweep speed switch each time a signal of a different repetition rate or frequency is desired to be displayed.

Attempts have been made to provide circuits for automatically selecting a sweep speed depending upon the repetition rate of the input signal. These attempts have usually involved circuits which count the number of repetitive signals occurring during a selected time interval or which produce standard pulses corresponding to the repetitions of the signal and then integrate such pulses with respect to time to develop a control voltage having a value which varies with the repetition rate or frequency of the input signal. This control voltage was then employed to vary the sweep voltage or time base rate produced by the time base generator. Such circuits have not been capable of producing or selecting calibrated time base rates or have required an excessive amount of time to select the appropriate time base rate.

In accordance with the present invention circuits are employed which produce a test pulse during the time interval in which a time base voltage is being generated by a sweep or time base generator. This pulse is employed in conjunction with trigger pulses derived from the input signal to cause changing of the time base rate of the sweep generator. The test pulse is of lesser width than the time base voltage waveform, i.e. it is present for a lesser time interval than the interval during which the time base voltage is generated, and its width changes as the time base rate is changed. Thus the test pulse width decreases as the time base rate increases and vice versa.

As in conventional oscilloscopes of the sweep triggered type, a circuit is provided for producing the trigger pulses referred to above. Thus a trigger pulse is produced for each repetition of the signal, and in time coincidence with a selected portion of each repetition. One of such trigger pulses is employed to initiate the generation of a time base voltage. In accordance with the present invention a circuit is provided for determining whether a subsequent trigger pulse is coincident with the test pulse, i.e. occurs during the time interval in which the test pulse referred to above is being produced or at a time other than during such time interval. Depending upon the result, the time base rate of the time base generator is changed to a rate more appropriate to the repetition rate of the signal. During the generation of the next time base voltage another test is made and, if necessary, a further change in time base rate is made until the desired rate is obtained. This occurs within a relatively few repetitions of the signal, since a plurality of changes of time base rate will occur during the generation of a single time base voltage if the rate initially being generated is considerably different from that appropriate to a given repetitive signal.

In the specific embodiment of the invention disclosed in this application, the time base generator initially generates a time base voltage at its lowest calibrated rate and the rate is increased in calibrated steps to the desired rate. The test pulse begins immediately after the trigger pulse which initiated the generation of the time base voltage. In case it is desired to select a time base rate which will display at least one complete repetition of the signal and less than two repetitions, the test pulse has a width approximately half of that of the time base voltage waveform being generated at any given time. If the next successive trigger pulse does not occur during the time interval in which the test pulse is being produced, then the slowest time base rate is the appropriate rate and no change in rate is made.

If the successive trigger pulse does occur during time interval in which the test pulse is produced, the time base rate is increased one step. If the appropriate rate is much faster than the initial rate, several trigger pulses will occur during the test pulse and the rate will be advanced an equivalent number of steps during the generation of the first time base voltage. A similar operation occurs during the generation of the next time base voltage and this operation continues, if necessary, to select the appropriate time base rate.

It will be apparent that the test pulse is progressively narrowed in width as the time base rate is increased and if any trigger pulses occur during the narrowed test pulse produced during the generation of the next time base voltage, the time base rate will again be increased a corresponding number of steps until an appropriate time base rate is obtained.

It should be noted that if the test pulse is adjusted so that it is approximately one-third the width of the time base voltage waveform being generated at any given time, then the system just discussed will cause the display of at least two but less than three complete repetitive signals and that further adjustment to make the test pulse still narrower relative to the width of the time base voltage waveform will cause more repetitions of the signal waveform to be displayed. It should also be noted that test pulses produced during the time base voltage waveform is being generated can be employed to cause the time base voltage to be decreased in rate from its highest selected rate to a more appropriate rate for the input signal or to be changed in either direction from the given rate of the time base voltage then being generated toward the appropriate rate. Also circuits of the type above discussed can be employed in devices other than oscilloscopes which include time base generator circuits.

It is therefore an object of the invention to provide an improved time base circuit for automatically producing a time base voltage having a rate appropriate for the repetition rate of a repetitive signal.

Another object of the invention is to provide a time base circuit in which a test pulse having a width related to the rate of a time base signal voltage being generated is produced and employed in conjunction with pulses derived from the waveforms of a repetitive input signal to select a time base voltage rate appropriate to the repetition rate of the input signal.

Another object of the invention is to provide an automatic sweep speed selector circuit for a cathode ray oscilloscope in which the sweep speed is changed to a speed more appropriate to the repetition rate of an input repetitive signal in response to a determination of whether a trigger pulse subsequent to a trigger pulse initiating the operation of a sweep voltage generator coincides with a test pulse of lesser width than the width of the sweep voltage waveform then being generated.

A still further object of the invention is to provide an automatic sweep speed selector for a cathode ray oscilloscope in which the coincidence of a trigger pulse occurring after the trigger pulse which initiates the generation of a sweep voltage waveform with a test pulse beginning after the initiating trigger pulse and of less width than the width of the sweep voltage waveform is employed to increase the rate of the sweep voltage then being generated.

Other objects and advantages of the invention will appear from the following description of a preferred embodiment of the invention illustrated in the attached drawing of which:

Figure 1:
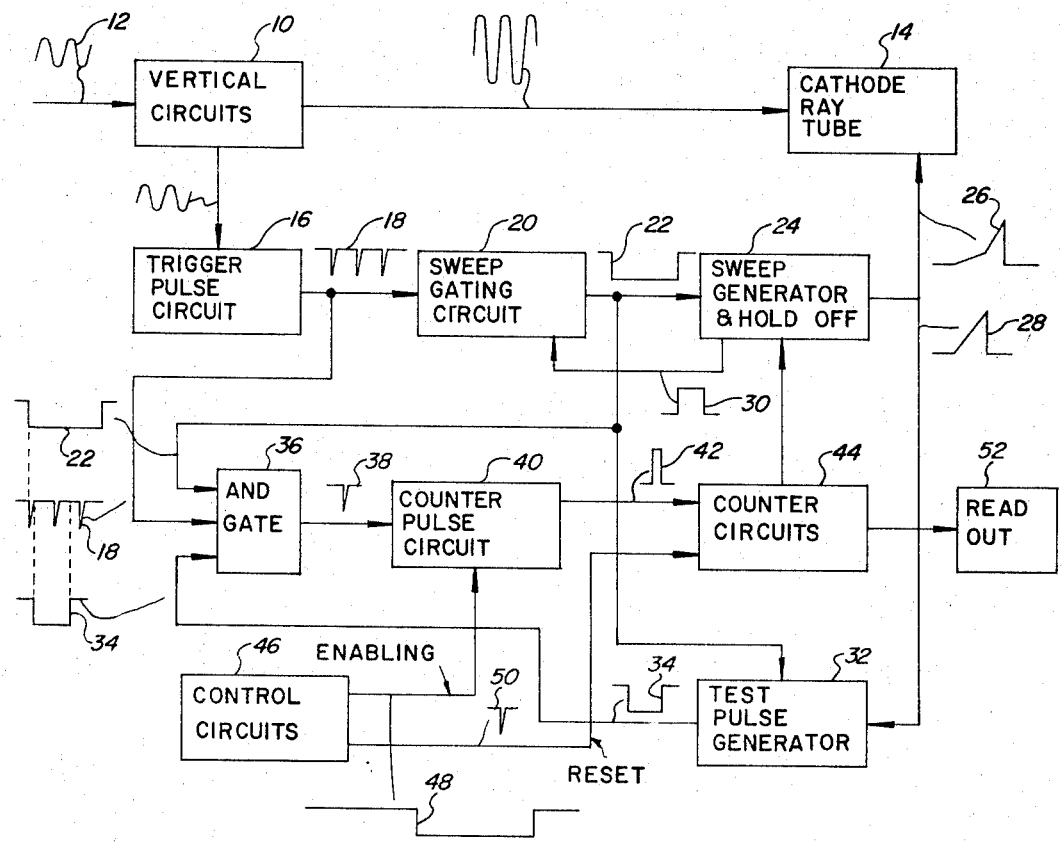
FIGURE 1 is a simplified block diagram of a cathode ray oscilloscope embodying the circuit of the present invention.

Referring more particularly to the drawings, a specific example of the invention illustrated in the block diagram of FIG. 1 includes a vertical circuit 10 to which is delivered an input signal 12 shown as a sine wave but which may be of any type of repetitive or periodic signal. The output of the vertical circuit which is delivered to the cathode ray tube 14 has the same form as the input signal 12 and has an amplitude proportional to the input signal. A signal having the form of the input signal and a standard amplitude is also delivered to a trigger pulse circuit 16. The output of the trigger pulse circuit is a series of standard trigger pulses 18, each of which corresponds in time to a selected portion of one repetition of the input signal 12. The trigger pulses 18 are delivered to a sweep gating circuit 20.

The sweep gating circuit will usually contain a multivibrator which can be triggered by a trigger pulse to cause it to change from one state to the other and thereby produce a sweep gating voltage waveform 22 which is delivered to sweep generator and holdoff circuits 24. The sweep generator portion 24a (FIG. 2A) of the circuits indicated at 24 produces a sweep voltage or time base voltage waveform which is delivered to the cathode ray tube 14. Two different waveforms for the sweep voltage or time base are shown, one of which 26 may occur during the automatic selection of a sweep rate appropriate to the repetition rate of the input signal 12 and the other 28 being the waveform which results from the selection of the appropriate sweep speed rate. When the sweep voltage reaches a predetermined maximum value, a holdoff pulse 30 is produced in the holdoff circuit portion 24b and is delivered back to the sweep gating circuit to terminate the sweep gating voltage and the sweep voltage and to also prevent the sweep gating circuit from again being triggered to produce another sweep gating waveform 22 until after the sweep generator and associate circuits have fully recovered.

As explained in detail below, the sweep generator circuits contain timing circuits for setting the sweep speed or time base rate of the output voltage of the sweep circuit. This in turn determines the width of the sweep voltage waveform 28. Timing circuits in the holdoff portion 24b determine the width of the holdoff pulse 30 which is produced. All of these timing circuits are automatically switched in accordance with the present invention to obtain a sweep speed appropriate for the repetition rate of the input signal. This is accomplished by circuits including a test pulse generator 32 which is responsive to sweep gating voltage waveforms 22, and sweep voltage waveforms 26 and 28 delivered thereto to produce test pulses 34. The test pulses 34 are delivered to an *and* or coincidence gate 36 to which is also delivered trigger pulses 18 from the trigger pulse circuit 16 and the sweep gating waveforms 22 from the sweep gating circuit 20. A test pulse 34 is initiated immediately after the trigger pulse 18 which causes initiation of a sweep gating waveform 22. The test pulse has a width which is a fraction of that of the sweep voltage waveform then being generated. That is to say, the test pulses decrease in width as the width of the sweep voltage waveform decreases. Since the sweep gating waveform 22 has the same width as the sweep voltage waveform, the width of the test pulse 34 bears the same relationship to the width of the sweep gating waveform 22 as that described above with respect to the sweep voltage waveform.

Whenever the sweep gating waveform 22, a trigger pulse 18 and a test pulse 34 are all delivered coincidentally to the *and* gate 36, a resulting pulse 38, which may be similar to the trigger pulse 18, is delivered to a counter pulse circuit 40 to produce a counter actuating pulse 42 which in turn is delivered to the counter circuits 44. The counter circuits 44 supply switching voltages through appropriate connectors to the sweep generator and holdoff circuits 24. As described below this causes switching of timing capacitors and resistors to change the sweep speed of the sweep voltages being generated to one more appropriate to the repetition rate of the input signal 12.

The operation of the counter pulse circuits and counter circuits 40 and 44, respectively, may be controlled by control circuits 46. Thus the control circuits normally supply an enabling or uninhibiting voltage 48 to the counter pulse circuit 40 when it is desired to cause automatic switching to a sweep speed more appropriate to the repetition rate of the input signal 12. When this enabling voltage is discontinued, i.e. an inhibiting voltage is supplied, a reset pulse 50 is produced and delivered to the counter circuits 44 to return the counter circuits to an initial or rest position. The counter circuits 44 also supply voltages which are delivered to a visual readout device 52 for producing a visual indication of the time base rate or speed of the sweep voltage then being generated.

Figure 2A:
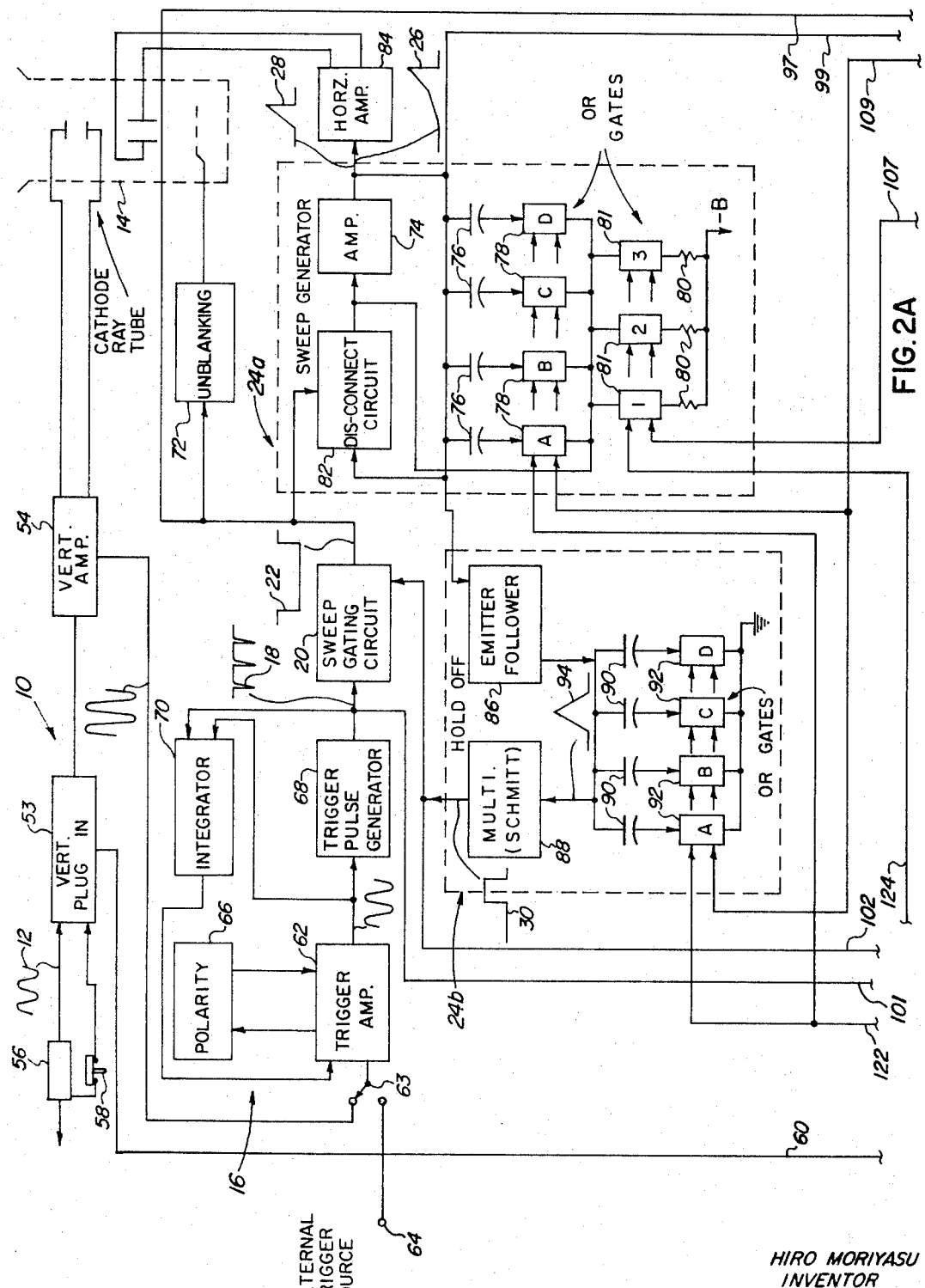
FIGURE 2A is a more detailed block diagram of the vertical and horizontal circuits of the oscilloscope showing some of the circuit components.
Figure 2B:
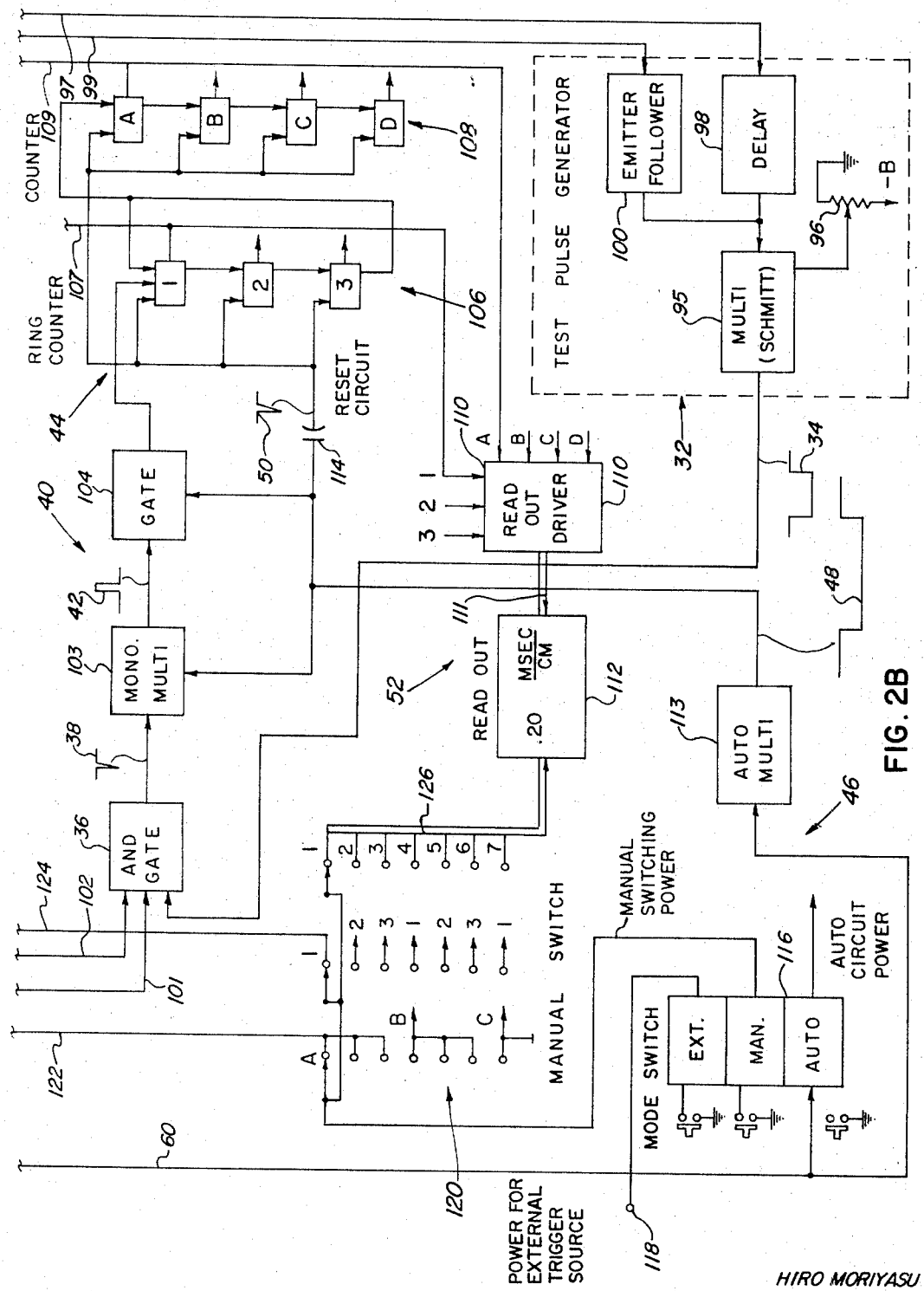
FIGURE 2B is a diagram similar to that of FIGURE 2A, showing the circuits which cause changing of the sweep speed in response to the coincidence of a trigger pulse with a test pulse generated by such circuits.

A more complete block diagram illustrating some of the internal circuits is shown in FIGS. 2A and 2B. Thus in FIG. 2A, the vertical circuit 10 is shown as including a vertical plug-in 53 which will conventionally include a vertical preamplifier. The vertical circuits also include a vertical amplifier 54 which will usually form a part of the permanent circuits of the oscilloscope. The vertical plug-in 53, usually has associated therewith a detachable probe 56 which may include a pushbutton or other switch 58, also connected with the vertical plug-in 53, to cause the plug-in to supply a control voltage to the automatic control circuits 46 as indicated by the line 60. Whenever the pushbutton 58 is actuated manually, and then released, an automatic selection of a sweep voltage rate is performed by the circuits of the present invention.

The trigger pulse circuit 16 is shown as including a trigger amplifier 62, which can be connected by the switch 63 to receive either the amplified input signal from the vertical amplifier 54 or a signal from an external trigger source through a connection 64. The trigger amplifier may have associated therewith a switching arrangement 66 marked polarity for reversing the polarity of the signal being amplified so as to deliver an output signal corresponding to the input signal, but of either polarity, to the trigger pulse generator 68, also forming part of the trigger pulse circuit 16. Trigger pulse generators desirably employ a tunnel diode connected as a multivibrator in conjunction with a differentiating circuit for producing narrow trigger pulses 18. Since such a multivibrator is desirably supplied with input signals of standard amplitude, the trigger pulse circuit is also shown as including an integrator 70 to which is delivered both the amplified input signal from the trigger amplifier and trigger pulses from the trigger pulse generator and which feeds back to the trigger amplifier an automatic gain control voltage which causes the trigger amplifier to deliver a signal of nearly constant amplitude to the trigger pulse generator.

The sweep gating circuit 20 includes essentially a multivibrator of the bistable type, which in one of its states and in the absence of the holdoff pulse 30 will be triggered by one of the trigger pulses 18 to cause such multivibrator to change to its other state and produce a sweep or time base gating voltage waveform 22. When the sweep gating multivibrator is in its initial or quiescent state, the sweep generator circuit 24a forming part of the sweep generator and holdoff circuits 24 is also in its quiescent state. When the sweep gating circuit is triggered to produce an output sweep gating voltage 22, the sweep generator circuit output is a sweep voltage waveform 26 or 28. At the initiation of the sweep gating voltage 22, the cathode ray tube 14, which is normally blanked by having a negative voltage applied to its control grid, is unblanked by the unblanking circuit 72 which supplies a positive voltage to the control grid of the cathode ray tube during the time interval that the sweep gating voltage waveform 22 is being produced.

The sweep generator circuit 24a shown is of the Miller integrator type and includes a high gain amplifier 74. The output of this amplifier, namely the sweep voltage waveform 26 or 28, is fed back to the input of such amplifier through a selected one of a series of timing capacitors 76 switched into the circuit by one of the *or* gates 78 labeled A, B, C and D, respectively. The charging current for the selected one of the capacitors 76 flows to —B through a selected one of the timing resistors 80 switched into the circuit by one of the *or* gates 81, labeled 1, 2, and 3, respectively. When one of the *or* gates 78 and at the same time one of the *or* gates 81 are opened to allow current flow therethrough, the circuit just described will be recognized as a capacitor feedback operational amplifier, known as a runup Miller integrator. Such a circuit produces a linearly increasing voltage, i.e. the leading portion of the waveform 28 or one of the linear sections of the leading portion of the waveform 26.

Such sweep generator circuits 24a include a disconnect circuit 82 which usually contains a pair of disconnect diodes. When the diodes of the disconnect circuit are conducting, a timing capacitor 76 connected to the circuit by an *or* gate 78 is discharged and the sweep generator is in its quiescent state. It will be noted that at this time there is a direct current feedback path from the output of the amplifier to the input thereof directly through the conducting disconnect circuit. During the time the sweep gating voltage waveform 22 is delivered to the disconnect circuit, the diodes of the disconnect circuit 82 are nonconducting and this results in the generation of the sweep voltage.

The output of the sweep generator is delivered through the horizontal amplifier 84 to the horizontal deflection plates of the cathode ray tube 14. This output is also delivered to the holdoff circuit and will ordinarily be transmitted to the holdoff pulse forming portion thereof through and emitter follower 86. When the sweep voltage 26 or 28 reaches a predetermined maximum value, the Schmitt multivibrator 88 forming part of the holdoff circuit is caused to change its state and to send the leading edge of the holdoff pulse 30 to the sweep gating circuit 20 to cause reversion of the sweep gating multivibrator contained therein and termination of the sweep gating voltage waveform 22. This causes the disconnect circuit 82 to again conduct to terminate the sweep voltage being generated and this sweep voltage falls rapidly to its quiescent state.

In order to prevent the sweep gating circuit from again being triggered before such circuit or the sweep generator has recovered, i.e. settled down into its quiescent state, the holdoff pulse 30 is made of sufficient width that triggering cannot occur until after such quiescent state is established. To do this, the trailing edge of the sweep voltage waveform at the output of the emitter follower 86 is extended by a timing circuit including one of the timing capacitors 90 selectively connected into the load circuit of the emitter follower by means of one of a series of *or* gates 92 also labeled A, B, C and D, respectively. The selected capacitor 90 is charged by the emitter follower during the generation of the sweep voltage. Upon rapid decrease of the trailing edge portion of the sweep voltage waveform, the emitter follower is cut off due to the capacitive load thereon and the selected timing capacitor 90 discharges through the usual resistive load of the emitter follower. This results in a stretching or delaying of the trailing edge of the sweep generator voltage waveform to provide the holdoff voltage waveform 94, having a more slowly decreasing trailing edge portion.

The holdoff multivibrator 88 again changes state when the trailing edge of the waveform 94 approaches its lowest value so that the capacitance of the selected capacitor 90 determines the width of the holdoff pulse 30. As stated above, as long as the holdoff pulse 30 is delivered to the sweep gating circuit 20 this circuit cannot be triggered but when the holdoff pulse 30 returns to its quiescent value, the next trigger pulse 18 will again trigger the sweep gating circuit to produce another sweep gating voltage waveform 22. It has been found desirable to vary the width of the holdoff pulse 30 and as the width of the sweep voltage waveform 26 or 28 is varied by the corresponding variation in the width of the sweep gating voltage waveform 22. This variation is accomplished by switching corresponding timing capacitors 90 in the holdoff circuit at the same time the timing capacitors 76 in the sweep generator circuit are switched. The various gates 78, 81 and 90 may be of any known or suitable type such as diode gates or transistor gates, or may be mechanical relays, for example, magnetic reed switches.

The timing capacitors 76 and 90 in the sweep generator and holdoff circuits, respectively, and also the timing resistors 80 of the sweep generator circuits are switched automatically through the *or* gates associated therewith by gating control circuits which include the test pulse generator 32, and gate 36, counter pulse circuits 40 and counter circuits 44. The test pulse generator circuit 32 may include a multivibrator 95 of the Schmitt type which has its normal or quiescent state when the test pulse 34 is not being generated. An adjusting circuit, such as indicated by the potentiometer 96, may be associated with the multivibrator 95 to enable the setting of the value of the sweep voltage which causes the test pulse to be terminated as described below to thereby adjust the width of the test pulse 34. The sweep gating voltage waveform 22 may be delivered to such multivibrator as indicated by the line 97 through a delay circuit 98 so as to cause such multivibrator to change its state and produce the leading edge of the test pulse 34. The delay produced by the circuit 98 can be a constant delay and should be just slightly greater than the width of a standard trigger pulse 18 produced by the trigger pulse generator. This delay prevents coincidence between the trigger pulse 18 which starts or initiates a sweep gating waveform 42 and the test pulse 34 initiated by such sweep gating waveform. The sweep voltage waveform 26 or 28 being generated at the time a test pulse 34 is initiated is also delivered to the multivibrator 95, as indicated by the line 99, preferably through an emitter follower 100, to cause such multivibrator to again change its state when the sweep voltage reaches a predetermined fraction of its maximum value, for example, approximately one-half of such maximum value. This terminates the test pulse 34 and the multivibrator 95 remains in its quiescent condition until another sweep gating voltage waveform 22 initiates the production of another test pulse 34.

The test pulse 34 is delivered to the *and* gate or coincidence circuit 36. Trigger pulses 18 and sweep gating voltage waveform 22 are also delivered to the *and* gate 36, as indicated by the lines 101 and 102, respectively. Whenever all three of these pulses or waveforms simultaneously arrive at the *and* gate 36, and only when this is true, an output pulse 38 will be delivered from the *and* gate 36. This output pulse 38 is sent to a monostable multivibrator 103 forming part of the counter pulse circuit 40 and when such monostable multivibrator 103 is at the same time receiving the enabling or uninhibiting voltage 48, the monostable multivibrator 103 produces an output counter pulse 42 which is delivered through a gate 104 to the counter circuits 44. The gate 104 is opened so as to transmit the counter pulse 42 only when the enabling or uninhibiting voltage 48 is also being supplied to the gate.

The counter circuits 44 include a ring counter 106 shown as having three stages labeled 1, 2 and 3, and also includes another counter circuit 108, shown, for example, as having four counter stages labeled A, B, C and D, although a greater number such as eight will ordinarily be provided. Thus timing circuits having greater or lesser numbers with associated counter circuits having corresponding numbers of stages can obviously be employed. In the initial or reset condition of the counters 106 and 108, and as indicated by line 107, a switching voltage is delivered from stage 1 of the ring counter 106 to the *or* gate 81 of the sweep generator which is labeled 1. This connects one of the timing resistors 80 in series in the timing circuit of the sweep generator. At the same time the counter stage A of the counter 108 delivers a switching voltage to the *or* gate labeled A of the series of *or* gates 78 and 92 associated with the sweep generator and holdoff circuit, respectively, as indicated by the line 109. This connects the associated timing capacitor 76 in series in the timing circuit of the sweep generator 24a and the timing capacitor 90 associated with the gate 92 labeled A in the timing circuit of the holdoff circuits 24b. In preferred circuits of the present invention, the timing capacitors 78 and 90 and timing resistors 80 connected into the respective timing circuits during the initial or reset condition of the counters 106 and 108 will be those having the highest values of capacitance and resistance, respectively, of any of the respective timing capacitors or resistors so as to produce the slowest sweep speed and the widest holdoff pulse capable of being produced by the timing circuits.

Upon receipt of a counter actuating pulse 42, the ring counter 106 transfers the delivery of an output switching voltage to the second stage thereof and thus delivers a switching voltage to an *or* gate 81 labeled 2 and at the same time discontinues the switching voltage to the *or* gate 81 labeled 1 to thus connect in the timing circuit a resistor 80 having a lesser resistance so as to increase the sweep speed or time base rate by one step. The next counter actuating pulse 42 which is delivered to the ring counter 106 will in a similar manner substitute the timing register 80 associated with the *or* gate 81 labeled 3 to again increase the sweep speed by one step. Arrival of the next counter pulse 42 will transfer the switching voltage output back to stage 1 of the ring counter 106.

At the same time a pulse from the third stage of the ring counter 106 will cause the counter 108 to transfer its switching voltage output to the second stage B thereof, resulting in substituting the timing capacitor 76 associated with the *or* gate 78 labeled B for the timing capacitor previously in the circuit and this will again increase the sweep speed by one step. This operation will continue until the sweep speed appropriate to the repetition rate of the input signal is reached.

It will be noted that timing capacitors 90 associated with the holdoff circuits are also switched at the same time that the timing capacitors 76 associated with the sweep generator circuits are switched. This means that the holdoff pulse 30 is narrowed for every third step of increase of sweep speed.

The voltages from the ring counter 106 and the counter 108 are also delivered to a readout driver 110 forming part of the readout device 52 and which may include a logic circuit of any suitable or conventional type. The readout driver is shown as being connected through a cable 111 to visual readout 112 which indicates the sweep speed which has been selected, for example, .20 microsecond per centimeter.

The control circuits for the automatic operation just described also include a multivibrator 113 which produces the enabling or uninhibiting voltage 48 under control of the switch 58 on the probe 56. When the automatic circuits are in operation, the enabling voltage 48 is normally on. Manual actuation of the switch 58 removes such enabling voltage during the time the switch is actuated. At the time the switch is initially actuated, a reset pulse 50 is produced by differentiating the rapid initial change of the enabling voltage 48 by a differentiating circuit including a capacitor 114. The reset pulse 50 causes the two counters to return to their initial condition in which the control voltage is supplied from stage 1 of the ring counter 106 and stage A of the counter 108.

The mode switch, indicated diagrammatically at 116, can be employed to select either automatic or manual operation and may also be employed to supply power to an external trigger source through a connection 118 when the trigger amplifier 62 is receiving external trigger pulses through the connection 64. The mode switch 116 supplies power to the automatic switch circuits including the *and* gate 36, counter pulse circuits 40, counter circuits 44, test pulse generator 32 and multivibrator 113 when automatic operation is desired, and at the same time energizes the circuits associated with the pushbutton switch 58 on the probe 56. When the mode switch is in the manual position, power is supplied to a manual switch 120 which is diagrammatically shown. Such switch can be employed for manually selecting a desired sweep speed when automatic operation is not desired or is impracticable because of the nature of the input signal. The manual switch 120 is shown as having connections to the *or* gates 78, 81 and 92, as indicated by the lines 122 and 124. Rotation of the switch knob (not shown) will supply voltages to such gates equivalent to the voltages from the ring counter 106 and counter 108 to cause such gates to select appropriate timing capacitors 76 and 90 and timing resistors 80 to produce a desired sweep speed. The manual switch is also shown as being connected by a cable 126 to readout device 112, and such switch may include logic circuit connections producing the correct visual readout. It is obvious that the switching voltages from the manual switch 120 can be connected to the readout driver 110 in the same manner that the switching voltages from the counters 106 and 108 are connected to such driver so as to control the readout device 112 through such driver.

Figure 3:
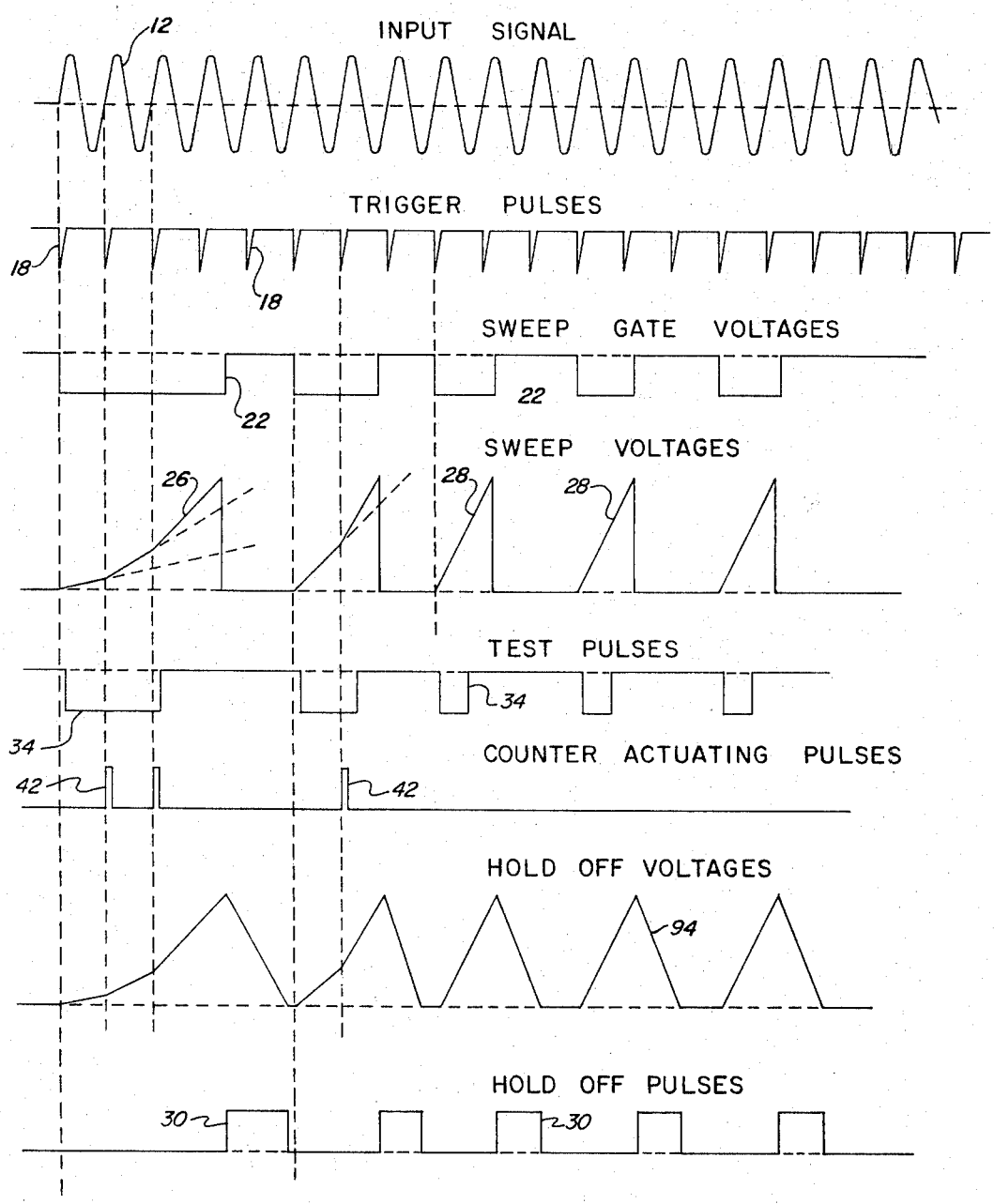
FIGURE 3 is a graph showing the time relation of various pulses and waveforms occurring or produced in different portions of the circuits of FIGURES 1, 2A and 2B.

The operation of the automatic circuits described above is believed to be apparent from the above description but a summary of such operation will be given in connection with FIG. 3. Trigger pulses 18 shown on FIG. 3 are derived from a corresponding portion of each repetition or cycle of the input signal 12 by the trigger pulse circuit 16. When the sweep gating circuit 20 is in its quiescent state and the holdoff pulse 30 is not being produced, a trigger pulse 18 will trigger such circuit to initiate production of a sweep gating voltage waveform 22 thereby. This will in turn initiate the production of a sweep voltage waveform such as waveform 26 or 28. Thus the trigger pulse 18 at the left of the graphs of FIG. 3, has caused initiation of the sweep gate voltage waveform at the left of such figure, resulting in the initiation of the sweep voltage waveform at the left of such figure. The two sweep gate voltage waveforms and the two sweep voltage waveforms nearest the left of such figure are initial waveforms which occur while the automatic circuits are seeking a sweep speed appropriate for a repetitive input signal 12. The same is true of the graph showing the holdoff voltages and the holdoff pulses and test pulses in FIG. 3.

The sweep gate voltage operates through the delay circuit 98 and multivibrator 95 of the test pulse generator 32 to initiate a test pulse 34 which starts a short time after the sweep gate voltage waveform 22 and also the sweep voltage waveform 26 is initiated. This delay should be just slightly greater than the width of the trigger pulses 18. The test pulse 34 may last until the sweep voltage waveform 26 reaches approximately half of its predetermined maximum value at which time the sweep voltage delivered to the multivibrator 95 of the test pulse generator 32 causes termination of the test pulse 34.

When portions of the test pulse 34 and the sweep gate voltage 22 being produced at that time both coincide in time with a trigger pulse 18, a counter pulse 42 is delivered to the counter circuits 44. Each time a counter pulse 42 arrives at the counter circuits, the counter circuits cause switching of timing elements in the sweep generator to increase the sweep speed and this accounts for the variation in the slope of the sweep voltage waveform 26 at the left of the FIG. 3. For example, two trigger pulses 18, the second and third from the left of FIG. 3, are shown in that figure as being produced during the test pulse 34. This results in a two step increase of sweep speed of the sweep voltage waveform at the left of FIG. 3.

The steep trailing edge portion of the sweep voltage waveform 22 is produced as the result of the waveform 26 being delivered to the holdoff circuit to cause the multivibrator 88 to change its state and initiate a holdoff pulse 30 which is in turn delivered to the sweep gating circuit 20 to terminate the sweep gating voltage and thus the generation of the sweep voltage. This trailing edge is extended by the holdoff circuit so that the holdoff voltage waveform 94 delivered to the holdoff multivibrator 88 of FIG. 2A is of the form shown at the left in FIG. 3. The holdoff pulse lasts during the relative slow decay of the holdoff voltage 94 and during this time, the sweep gating circuit 20 cannot be triggered by subsequent trigger pulses 18.

Upon the arrival of a trigger pulse 18 after the holdoff pulse 30 has been terminated, the sweep gating circuit is again triggered to produce another sweep gating voltage waveform 22 and, in the case illustrated in FIG. 3, another trigger pulse 18 arrives during such sweep gating voltage waveform and also during the second test pulse 34 from the left of FIG. 3, so that further increase of sweep speed is produced as shown by the second sweep speed waveform from the left of FIG. 3. Again after a holdoff interval set by a second holdoff pulse 30, the sweep gating circuit is triggered to produce another sweep gate voltage waveform 22, a third sweep gate voltage waveform designated 28 and a third test pulse 34. This test pulse is sufficiently short that no further trigger pulses are produced during this test pulse and no further switching of capacitors or resistors in timing circuits of the sweep generator and holdoff circuits results. This occurs when the time base rate of the sweep voltage waveforms 28 is such that one complete cycle or repetition of the input signal is displayed on the cathode ray tube screen. Although, for purposes of clarity, only three switching steps are shown as occurring before the appropriate sweep is produced, it should be apparent that, if the repetition rate of the input signal is very large, i.e. a complete repetition of the waveform of the input signal is very short compared to the width of the sweep voltage waveform then being generated, a large number of trigger pulses 18 will occur during a single test pulse 34 so that a large number of switching operations will occur during such test pulse. In any event, the desired sweep speed or time base rate is very rapidly obtained.

It should be apparent from the above discussion of operation that it is not essential that the sweep gating voltage waveform 22 be an input to the and gate 36 since coincidence of a trigger pulse 18 and a test pulse 34 is sufficient to produce the operation described. The additional requirement for coincidence with the sweep gating voltage is however useful in preventing spurious actuation of the counter circuits and is also useful in possible modified operations of the circuits discussed below.

It should also be apparent that, if the width of the test pulses 34 are made a smaller fraction of the width of the sweep voltage waveform than the approximate one half mentioned above, the automatic sweep speed selecting mechanism just described will stop its selection when somewhat more than two complete repetitions of the input signal are displayed. Making the width of the test pulse a still smaller fraction of the width of the time base voltage waveform, will cause additional cycles or repetitions of the input signal to be displayed. This can be accomplished by adjusting the Schmitt multivibrator 95 of the test pulse generator circuit by any suitable means, such as by the potentiometer 96 to cause it to revert at a lower value of the sweep voltage delivered thereto. Also if it is desired to display less than a complete waveform of the repetitive signal, the test pulse may be made greater in width than approximately one half of the width of the sweep voltage waveform, for example, three fourths of the width of the sweep voltage waveform.

While the specific example of the invention disclosed herein embodies circuits resulting in the operation which has just been described, it should be noted that modified operations of the circuits of the present invention are possible. Thus such circuits can cause the sweep generator to initially operate at its highest calibrated sweep speed. Then if no successive trigger pulses occur during a somewhat wider test pulse than the test pulse 34 just discussed, the counter circuits 44 and associated or gate circuits can be made to decrease the sweep speed being generated in steps until a trigger pulse does occur during the test pulse at which time the appropriate sweep speed is obtained. By arranging the circuit to make tests which alternate between the type just described and the type first described above, the time base rate can be automatically increased or decreased in the proper direction to arrive at the appropriate sweep speed, starting at any speed which the sweep generator happens to be generating at that time. It should also be noted that the test pulse can occupy other positions relative to the time base voltage waveform during such waveform so that a trigger pulse occurring subsequent to the trigger pulse which initiated the sweep voltage waveform then being generated and before the test pulse begins can be employed to cause an increase of sweep speed. A trigger pulse occuring during such pulse would produce no change in sweep speed and in case no such subsequent trigger pulse occurred before or during the test pulse, a decrease of sweep speed would be produced. Other modifications employing coincidence between a test pulse and trigger pulses, and in some cases also with the sweep gating voltage, waveforms are also possible.

I claim:

1. A time base circuit for generating a time base voltage having a time base rate appropriate for the repetition rate of the waveform of a repetitive signal comprising:

time base generator means responsive to a predetermined portion of one repetition of said waveform for generating during a selected time interval a time base voltage having a selected time base rate;

said time base generator means including a timing circuit, a plurality of timing elements for setting said time base rate and gating means for selectively switching said elements into and out of said circuit;

gating control means including means controlled by said time base generator for producing during said time interval a test pulse having a width corresponding to a time interval which is less than said selected time interval; and means for selectively supplying gating voltages to said gating means including means controlled by said time base generator for making a determination of whether said predetermined portion of subsequent repetitions of said waveform occurs during said test pulse or at a time other than during said test pulse and means responsive to said determination for producing and delivering said gating voltage to said gating means to change the time base rate of said time base voltage to a time base rate more appropriate for said repetition rate.

2. A time base circuit for generating a time base voltage having a time base rate appropriate for the repetition rate of the waveform of a repetitive signal comprising:

time base generator means for generating during a selected time interval a time base voltage having a selected time base rate and starting in time relation with a predetermined portion of one repetition of said waveform;

said time base generator means including a timing circuit, a plurality of timing elements for setting said time base rate and gating means for selectively switching said elements into and out of said circuit;

gating control means including means controlled by said time base generator for producing during said time interval a test pulse having a width corresponding to a time interval which is less than said selected time interval;

means controlled by said time base generator for making a determination of whether said predetermined portion of any subsequent repetition of said waveform occurs during said test pulse or at a time other than during said test pulse;

counter pulse means responsive to said determination for producing a counter actuating pulse; and counter means responsive to counter actuating pulses from said counter pulse means for selectively supplying gating voltages to said gating means to cause a change of the time base rate of said time base voltage to a time base rate more appropriate for said repetition rate.

3. A time base circuit for generating a time base voltage having a time base rate appropriate for the repetition rate of the waveform of a repetitive signal comprising:

means responsive to a predetermined portion of each repetition of said waveform for producing a trigger pulse;

time base generator means having its operation initiated when one of said trigger pulses is produced and operating to generate a time base voltage having a selected time base rate for a time interval which decreases or increases as said selected time base rate is increased or decreased respectively;

means controlled by said time base generator for producing during said time interval a test pulse having a width which is increased or decreased as said time interval increases or decreases respectively;

means controlled by said time base generator for making a determination of whether a successive trigger pulse occurs during said test pulse or at a time other than during said test pulse; and means responsive to said determination for causing said time base generator means to change the time base rate of said time base voltage to a time base rate more appropriate for said repetition rate.

4. A time base circuit for generating a time base voltage having a time base rate appropriate for the repetition rate of the waveform of a repetitive signal, comprising:

means responsive to said signal for producing a trigger pulse in timed relation to a predetermined portion of each repetition of said waveform;

time base generator having its operation initiated when one of said trigger pulses is produced and operating to generate a time base voltage having a selected time base rate for a time interval which decreases or increases as said selected time base rate is increased or decreased respectively;

means controlled by said time base generator for producing during said time interval a test pulse initiated subsequent to said one trigger pulse and having a width corresponding to a time interval which is less than the first mentioned time interval and which is increased or decreased as said first mentioned time interval increases or decreases respectively;

means controlled by said time base generator for making a determination of whether a subsequent trigger pulse occurs during said test pulse or at a time other than during said test pulse; and means responsive to said determination for causing said time base generator means to change the time base rate of said time base voltage to a time base rate more appropriate for said repetition rate.

5. A time base circuit for generating a time base voltage having a time base rate appropriate for the repetition rate of the waveform of a repetitive signal, comprising:

means responsive to said signal for producing a trigger pulse in time relation to a predetermined portion of each repetition of said waveform;

means responsive to one of said trigger pulses for producing a time base gating voltage;

time base generator means responsive to said time base gating voltage for generating a time base voltage having a selected time base rate and for terminating said gating voltage and said time base voltage after a time interval which decreases or increases as said selected time base rate is increased or decreased respectively;

means controlled by said time base generator for producing during said time interval a test pulse beginning after said one trigger pulse and having a width which is increased or decreased as said time interval increases or decreases respectively;

means controlled by said time base generator for making a determination of whether a subsequent trigger pulse occurs during the time said time base gating voltage is being produced and during said test pulse or at a time other than during said test pulse; and means responsive to said determination for causing said time base generator means to change the time base rate of said time base voltage to a time base rate more appropriate for said repetition rate.

6. A time base circuit for producing a time base voltage having a time base rate appropriate for a repetitive signal, comprising:

means responsive to said signal for producing a trigger pulse in timed relation to a predetermined portion of each repetition of the waveform of said signal;

means responsive to one of said trigger pulses for producing a time base gating voltage;

time base generator means responsive to said time base gating voltage for generating a time base voltage having a selected time base rate and for terminating said gating voltage and said time base voltage after a time interval which decreases or increases as said selected time base rate is increased or decreased respectively;

means controlled by said time base generator for producing during said time interval a test pulse beginning after said one trigger pulse and having a width which is increased or decreased as said time interval increases or decreases respectively;

coincidence means responsive to said time base gating voltage, said test pulse and a subsequent trigger pulse for producing a counter actuating pulse whenever said subsequent trigger pulse occurs during said time base gating voltage and said test pulse; and means including counter circuits responsive to counter actuating pulses from said coincidence means for causing said time base generator means to change the time base rate of said time base voltage to a time base rate more appropriate for said repetitive signal.

7. A time base circuit for generating a time base signal having a time base rate appropriate for the repetition rate of the waveform of a repetitive signal, comprising:

time base signal generating means for generating a time base signal having a selected one of a plurality of predetermined time base rates during a first time interval;

means responsive to a predetermined portion of one repetition of said waveform for initiating the generation by said generator means of a time base signal having said one of said predetermined time base rates;

means controlled by said generator means in accordance with the time base rate of the time base signal being generated by said generator means for establishing a second time interval during said first time interval which is less than said first time interval;

test means responsive to a predetermined portion of a subsequent repetition of said waveform for making a determination of whether said predetermined portion of said subsequent repetition of said waveform occurs during said second time interval or at a time other than during said second time interval; and means controlled by said test means for changing in accordance with said determination the time base rate of the time base signals generated by said generator to another of said predetermined time base rates which is more appropriate for said repetition rate.

8. A time base circuit in accordance with claim 7 in which;

said means controlled by said generator means includes means for producing a test pulse having a width corresponding to said second time interval;

and said test means includes means for determining whether said predetermined portion of said subsequent repetition of said waveform occurs during said test pulse or at a time other than during said test pulse.

9. A time base circuit in accordance with claim 8 in which;

said means responsive to a predetermined portion of said one repetition of said waveform includes means for producing a trigger pulse;

and means responsive to said trigger pulse for initiating the generation by said generator means of said time base signal;

and said means controlled by said generator means includes means for delaying the producing of said test pulse until a time subsequent to said trigger pulse.

10. A time base circuit in accordance with claim 9 in which;

said test means includes means for producing another trigger pulse;

and means for determining whether said other trigger pulse occurs during said test pulse or at a time other than during said test pulse.

11. A time base circuit in accordance with claim 9 in which;

said means for initiating the generation by said generator means includes means responsive to said trigger pulse for initiating the production of a time base gating voltage;

means responsive to the initiation of said time base gating voltage for initiating the production of said time base signal;

means responsive to a predetermined value of said time base signal for terminating said test pulse;

and means responsive to a subsequently reached predetermined value of said time base signal for terminating said time base gating voltage and said time base signal.

References Cited

UNITED STATES PATENTS

| | | | |
|---|---|---|---|
| 2,448,069 | 8/1948 | Ames, Jr., et al. | 328—181 XR |
| 2,562,188 | 7/1951 | Hance | 328—185 |
| 2,581,199 | 1/1952 | Moe | 328—185 XR |
| 3,138,764 | 6/1964 | Dalton et al. | 328—182 |
| 2,266,516 | 12/1941 | Russell | 328—185 |
| 2,928,003 | 3/1960 | Etter | 328—176 XR |

ARTHUR GAUSS, *Primary Examiner.*

S. D. MILLER, *Assistant Examiner.*

U.S. Cl. X.R.

307—228, 263, 265, 271, 293; 328—114